June 2, 1959

W. L. AMMANN 2,889,142

CROP CONDITIONING MEANS

Filed Jan. 8, 1957

William L. Ammann
INVENTOR

BY *Clanow Heo.*

ATTORNEYS.

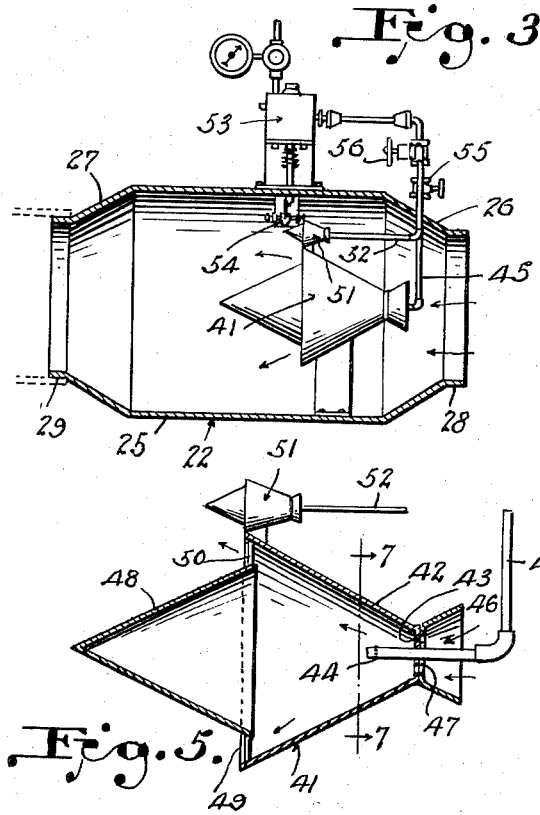
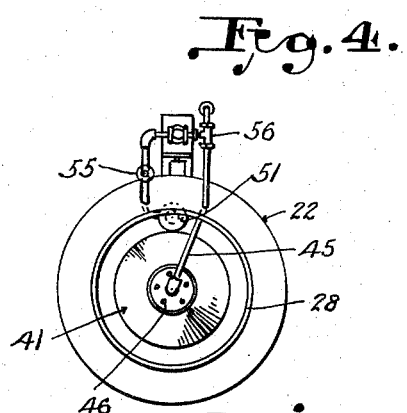
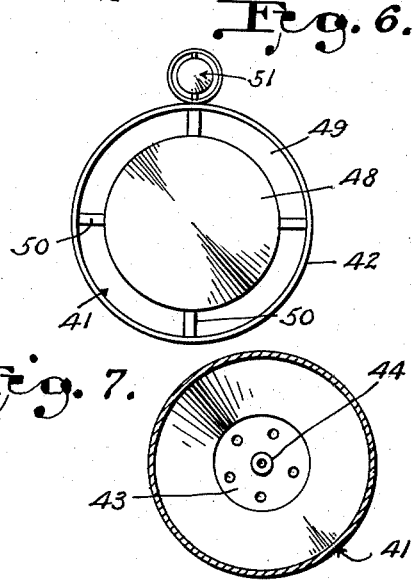

United States Patent Office 2,889,142
Patented June 2, 1959

2,889,142
CROP CONDITIONING MEANS
William L. Ammann, Argonia, Kans.

Application January 8, 1957, Serial No. 633,112

1 Claim. (Cl. 263—19)

This invention relates to a crop conditioning means. An object of this invention is to provide means whereby a crop of hay, alfalfa, clover, or the like when cut and disposed in stacks, may be properly conditioned for safe storage. It is well known that during the harvesting period the cut and stacked crops frequently become wet so that the material cannot be placed in a suitable storage until it has thoroughly dried. It is, therefore, an object of this invention to provide an improved crop conditioning means which is portable so that it can be moved to the desired location in order to dry out the material in the stack.

Another object of this invention is to provide a crop conditioner which includes a burner housing with a blower connected to one end of the housing, and a duct connected to the other end of the housing for directing the heated air to a spreader which is positioned at the bottom of the stack or pile.

A further object of the invention is to provide a crop conditioner wherein the blower may be operated from the power take-off of a tractor, or may be operated by any other suitable and convenient power means.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Fig. 3 is a sectional view taken substantially on line 3—3 of Fig. 1.

Fig. 4 is a detail rear end elevation of the heater unit.

Fig. 5 is a vertical section taken through the burner.

Fig. 6 is a detail front elevation of the burner with the pilot.

Fig. 7 is a sectional view taken on line 7—7 of Fig. 5.

Figure 1:
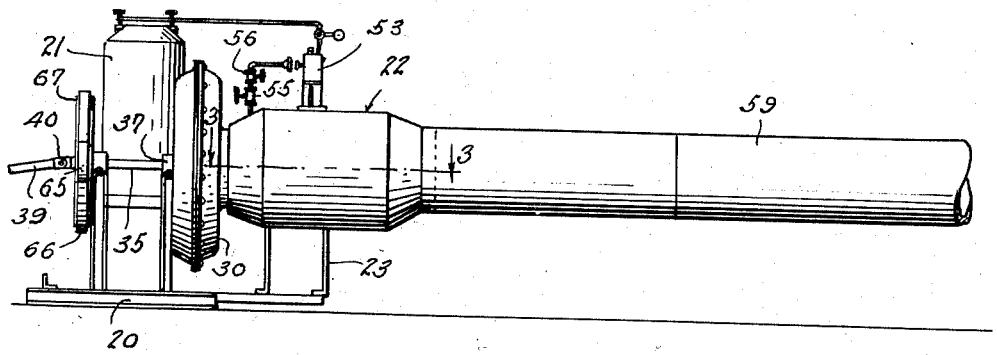
Fig. 1 is a fragmentary side elevational view of a crop conditioner constructed according to an embodiment of the instant invention.
Figure 2:
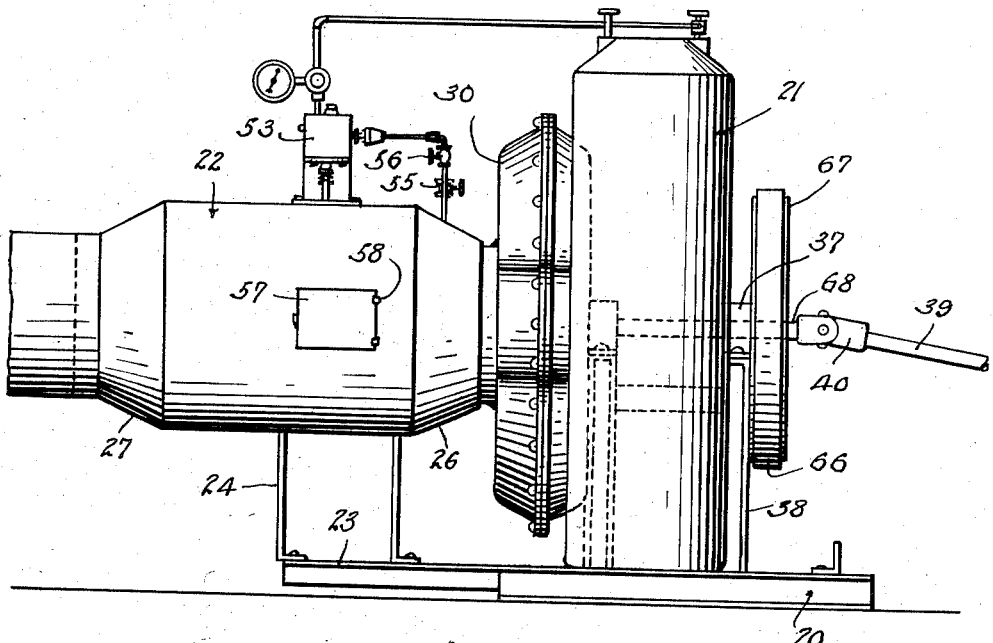
Fig. 2 is a detail side elevation opposite from that shown in Fig. 1 on an enlarged scale.

Referring to the drawings, the numeral 20 designates generally a portable base which has mounted thereon a fuel supply tank 21 adapted to contain fuel under pressure such as gas or the like.

A cylindrical heater housing generally indicated at 22 is supported from forwardly projecting supporting means 23 extending from the base 20 with upwardly projecting supporting channels 24 secured to the heater 22 and the supporting means 23. The heater 22 comprises a cylindrical body 25 having tapered opposite ends 26 and 27 which are of frusto-conical configuration and the small ends of the tapered members 26 and 27 terminate in cylindrical nipples 28 and 29 respectively. The nipple 28 is the intake nipple through which air is adapted to pass and to flow through the cylindrical body 25 and then out through the discharge nipple 29. The nipple 28 is secured to one side of a blower housing 30 being secured in telescoping position over the discharge nipple 31 carried by the housing 30. The blower housing 30 has rotatable therein a shaft 35 on which a blade member is secured. The shaft 35 is journaled in bearings 37 carried by upstanding supports 38 secured to the base 20. Shaft 35 has fixed thereon a pulley 65 about which a belt 66 engages and belt 66 engages about a large pulley 67 secured to a shaft 68. Shaft 68 is journaled in bearings secured to a horizontal supporting bar and shaft 68 is rotated by a drive shaft 39 with a universal joint 40 interposed between shaft 39 and shaft 68.

In order to provide means for heating the air flowing through the heating member 22 and prevent the passage of sparks, flame or the like through the discharge end of the heater member 22, I have provided a burner structure generally indicated at 41. The burner structure 41 includes a conical member 42 having an apertured plate 43 at the apex thereof and a fuel nozzle 44 extends through the plate 43. The nozzle 44 is connected by means of a pipe 45 to the fuel supply tank 21, as will be hereinafter described. A frusto conical air regulating and intake member 46 is disposed about the nozzle 44 in confronting position to the plate 43 and is provided with an inner apertured plate 47 adapted when in fully open position, to have the apertures thereof register with the apertures in plate 43. A conical baffle 48 is disposed at the forward end of the conical member 43 and a base of substantially smaller diameter than the diameter of the base of conical member 42 so that an air passage 49 will be provided between the conical members 42 and 48. The conical member 48 which forms a baffle and has the inner side thereof confronting the nozzle 44 is supported with the base thereof concentric to the base of conical member 42 by means of radially disposed supporting bars 50. The flame from the burner nozzle 44 is directed forwardly into the interior of baffle 48 and this baffle is then heated to a high degree and the heat thereof, together with the heat emanating from the burning fuel is adapted to pass out of the base of conical member 42 in the space 49. The heated air is then forced forwardly mixing with the air flowing through heater member 22 from blower 30.

A pilot burner generally indicated at 51 is secured at the upper side of the heater or burner member 41 and the pilot member 51 is of a construction identical with the construction of heater member 41 on a reduced scale. The burner nozzle of pilot 51 is connected by means of a pipe 52 to the supply tank 21. The passage or flow of gas to the burner 41 and to the pilot 51 is automatically controlled by means of an automatic regulating means 53 which is actuated by heating of a control means 54 projecting into the heater member 22. Manually operated valves 55 and 56 are interposed in the pipes 45 and 52 respectively so that the flow of fuel to the pilot and the main burner 41 may be manually adjusted. Heater member 22 has a door 57 hinged as at 58 to one side thereof whereby pilot 51 may be lighted and the condition of burner 41 may be inspected.

The heated air which flows outwardly through the heating member 22 passes through a tubular conductor 59 which is connected at one end to the nipple 29 and the tubular member 29 is extended forwardly for a substantial distance and is then connected to the distributing housing.

It will be understood that this conditioner may be used with stored grain as well as hay, and may be used for curing of leaf as well as grass or hay products.

What is claimed is:

An air heater for a crop conditioner comprising a cylindrical body, a burner in said body formed of a conical member, a burner nozzle concentric with said member and directed toward the base thereof, a frusto conical air intake member surrounding said nozzle and having its smaller end confronting the smaller end of said conical member, an apertured plate surrounding said nozzle at the juncture of said conical member and said frusto conical air intake member, a second apertured plate adjacent said first mentioned apertured plate, said plates being rotatable relative to each other, to align or disalign the apertures therein, a fixed conical baffle disposed at the base thereof confronting and interiorly of the base of said conical member, and having a base of diameter less than the base of said member, a blower connected at the pressure side thereof to said body, and pilot burner in said body adjacent the juncture of said conical member and said conical baffle.

References Cited in the file of this patent

UNITED STATES PATENTS

| | | |
|---|---|---|
| 365,008 | Kernodle | June 14, 1887 |
| 2,214,503 | Landis | Sept. 10, 1940 |
| 2,524,622 | Caparone | Oct. 3, 1950 |
| 2,541,332 | Campbell | Feb. 13, 1951 |
| 2,670,191 | Furth | Feb. 23, 1954 |